United States Patent
Long

(10) Patent No.: US 12,399,707 B2
(45) Date of Patent: Aug. 26, 2025

(54) BIPHASIC NESTED SNAPSHOTS FOR EFFICIENT TESTING OF MUTUALLY INCOMPATIBLE RESOURCES

(71) Applicant: Dell Products L.P., Round Rock, TX (US)

(72) Inventor: Bethany Long, Tacoma, WA (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 18/319,262

(22) Filed: May 17, 2023

(65) Prior Publication Data

US 2024/0385829 A1 Nov. 21, 2024

(51) Int. Cl.
*G06F 8/658* (2018.01)
*G06F 8/41* (2018.01)
*G06F 11/3668* (2025.01)

(52) U.S. Cl.
CPC .............. *G06F 8/658* (2018.02); *G06F 8/433* (2013.01); *G06F 11/3668* (2013.01); *G06F 2201/84* (2013.01)

(58) Field of Classification Search
CPC ...... G06F 8/658; G06F 8/433; G06F 11/3668; G06F 2201/84; G06F 8/65; G06F 11/3688
USPC .................................................. 717/120–178
See application file for complete search history.

(56) References Cited

U.S. PATENT DOCUMENTS

| | | | | |
|---|---|---|---|---|
| 9,152,642 B2 * | 10/2015 | Harrison | ............... | G06F 16/951 |
| 11,544,050 B1 * | 1/2023 | Ankit | ........................ | G06F 8/65 |
| 12,229,082 B2 * | 2/2025 | Pandit | ................. | G06F 11/1458 |
| 2004/0181790 A1 * | 9/2004 | Herrick | ...................... | G06F 8/60 |
| | | | | 717/174 |
| 2016/0034492 A1 * | 2/2016 | Harrison | ............... | G06F 16/164 |
| | | | | 707/827 |
| 2018/0035307 A1 * | 2/2018 | Mahimkar | ............ | H04L 41/147 |

(Continued)

OTHER PUBLICATIONS

Czerwonka, Jacek, et al. "Crane: Failure prediction, change analysis and test prioritization in practice—experiences from windows." 2011 Fourth IEEE international conference on software testing, verification and validation. IEEE, 2011. pp. 357-366 (Year: 2011).*

(Continued)

*Primary Examiner* — Satish Rampuria
(74) *Attorney, Agent, or Firm* — Amin, Turocy & Watson, LLP

(57) ABSTRACT

A system can comprise a processor and a memory that can store executable instructions that, when executed by the processor, facilitate performance of operations comprising, testing performance of at least a first patch, without modifying at least the first patch, prior to releasing at least the first patch as a customer-facing resource. The testing can comprise an efficiency phase, wherein a first snapshot of a computing system corresponding to a first point in time can be generated after an initial setup of the computing system. The testing can further comprise an incompatibility phase, wherein a second snapshot of the computing system corresponding to a second point in time, generated after installing at least the first patch applicable to update the initial setup to an updated setup, can be made accessible via the cloud storage, enabling an authorized user to set up the computing system according to the updated setup.

20 Claims, 10 Drawing Sheets

(56) References Cited

U.S. PATENT DOCUMENTS

2021/0211349 A1* 7/2021 Grant ................. H04L 41/0866
2022/0342659 A1* 10/2022 Parthasarathy ..... G06F 11/3409

OTHER PUBLICATIONS

Schermann, Gerald, et al. "Bifrost: Supporting continuous deployment with automated enactment of multi-phase live testing strategies." Proceedings of the 17th International Middleware Conference. 2016. pp. 1-14 (Year: 2016).*

Srinivasan, Deepa, et al. "Process out-grafting: an efficient"out-of-vm" approach for fine-grained process execution monitoring." Proceedings of the 18th ACM conference on Computer and communications security. 2011. pp. 363-374 (Year: 2011).*

Kapur, P. K., Ompal Singh, and Avinash K. Shrivastava. "A unified approach for optimal release, patching and testing time of a software." International Journal of Mathematics in Operational Research 13.4 (2018): pp. 471-491. (Year: 2018).*

Yang, Jinqiu, et al. "Better test cases for better automated program repair." Proceedings of the 2017 11th joint meeting on foundations of software engineering. 2017. pp. 831-841. (Year: 2017).*

Srivastava, Amitabh, and Jay Thiagarajan. "Effectively prioritizing tests in development environment." Proceedings of the 2002 ACM SIGSOFT international symposium on Software testing and analysis. 2002. pp. 97-106. (Year: 2002).*

ORACLE | "Oracle VM VritualBox. User Manual for Release 6.0". Webpage https://docs.oracle.com/en/virtualization/virtualbox/6.0/user/snapshots.html, last accessed May 15, 2023, 4 pages.

* cited by examiner

BIPHASIC NESTED SNAPSHOTS FOR EFFICIENT TESTING OF MUTUALLY INCOMPATIBLE RESOURCES

TECHNICAL FIELD

The subject disclosure relates to software testing and, more specifically, to biphasic nested snapshots for efficient testing of mutually incompatible resources.

BACKGROUND

Software testing of patch artifacts can include testing for performances of the patch artifacts prior to deployment of the patch artifacts for customer usage.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

According to an embodiment, a method is provided. The method can comprise after completing an initial setup of a system corresponding to an authorized user and prior to a testing process applied to the system, generating, using at least one processor, a first snapshot of the system corresponding to a first point in time, wherein the first snapshot is made accessible via network storage and is usable to setup the system according to the initial setup for the authorized user or another authorized user on the system or another system. The method can further comprise, after installing at least one patch applicable to update the initial setup to an updated setup and prior to performing the testing process with respect to the updated setup, generating a second snapshot of the system corresponding to a second point in time later than the first point in time. The method can further comprise after installing test code that can implement the testing process, executing the testing process, wherein the testing process can determine an incompatibility between dependencies of the system after the installing of the at least one patch and ensure that the at least one patch is performing according to at least a threshold performance level. The method can further comprise after completion of the testing process, restoring the system using the second snapshot corresponding to the second point in time.

According to an embodiment, a system is provided. The system can comprise a processor and a memory that can store executable instructions that, when executed by the processor, facilitate performance of operations, the operations comprising testing performance of at least a first patch, without modifying at least the first patch, prior to releasing at least the first patch as a customer-facing resource. The testing can comprise an efficiency phase, wherein a first snapshot of a computing system corresponding to a first point in time can be generated after an initial setup of the computing system, and wherein the first snapshot can be made accessible via cloud storage, enabling an authorized user or another authorized user of the computing system to setup the computing system according to the initial setup. The testing can further comprise an incompatibility phase, wherein a second snapshot of the computing system corresponding to a second point in time can be generated after installing at least the first patch applicable to update the initial setup to an updated setup, and wherein the second snapshot can be made accessible via the cloud storage, enabling the authorized user or the other authorized user of the computing system to set up the computing system according to the updated setup after completion of a testing process.

According to yet another embodiment, a non-transitory machine-readable medium is provided. The non-transitory machine-readable medium can comprise executable instructions that, when executed by a processor, facilitate performance of operations comprising testing performances of mutually incompatible resources comprising at least a first patch, without modifying at least the first patch, prior to releasing at least the first patch as a customer-accessible resource. The testing can comprise generating, by an authorized user of a computing system, a first snapshot of the computing system corresponding to a first point in time after an initial setup of the computing system, wherein the first snapshot can be made accessible via network storage, enabling the authorized user or another authorized user of the computing system to setup the computing system according to the initial setup. The testing can further comprise generating, by the authorized user of the computing system, a second snapshot of the computing system corresponding to a second point in time after installing at least the first patch applicable to update the initial setup to an updated setup, wherein the second snapshot can be made accessible via the network storage, enabling the authorized user or the other authorized user of the computing system to set up the computing system according to the updated setup after completion of a testing process.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Figure 1:
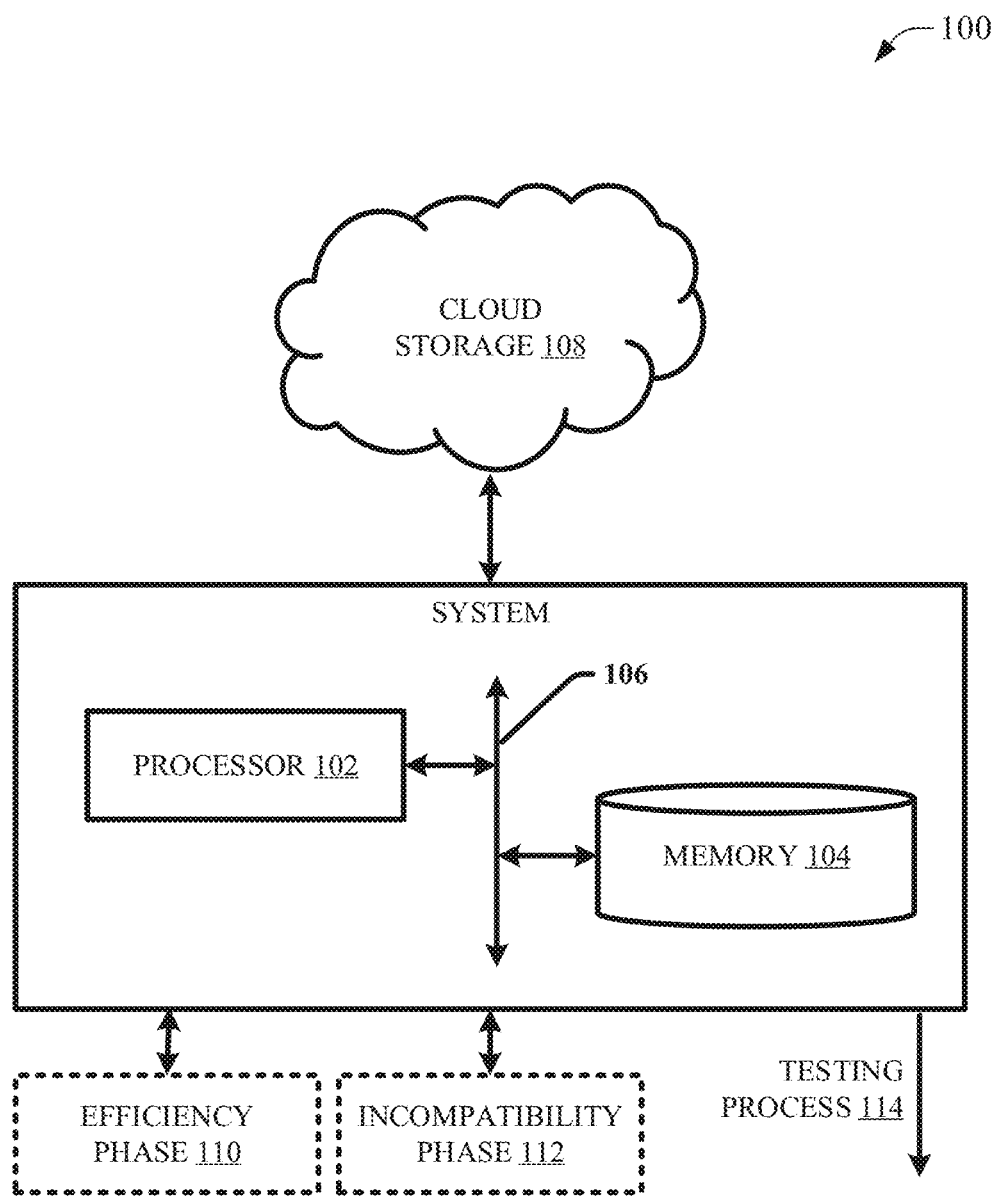
FIG. 1 illustrates a block diagram of an example, non-limiting system that can enable testing performance of one or more patch artifacts via biphasic nested snapshots in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In other instances, well-known structures and devices are shown in block diagram form in order to facilitate describing the subject disclosure.

The HealthCheck (HC) system on the PowerScale OneFS (hereinafter, 'OneFS' or 'PowerScale') operating system by DELL EMC can be delivered as a patch artifact (marketed as 'definition package') which can be installed or uninstalled on a running system. The release process for the HC system can comprise extensively testing a battery of scenarios for each supported OneFS version corresponding with typical customer usage, including installing HC patches alongside OneFS roll up patches (RUPs), wherein the RUPs can comprise service packs or collections of hotfixes that can remediate critical product defects, to ensure that the HC patches and the RUPs are compatible. However, as OneFS releases become older and RUPs become more complex, they start to touch files that are also manipulated by internal testing dependencies, which can cause a patch system on OneFS to refuse to install or uninstall patches to ensure system integrity, when the patch system notices that the files tracked by the patch system have been manipulated. Thus, a user/entity cannot install RUPs on systems where an internal quality assurance (QA) environment has been installed, nor can the user/entity uninstall RUPs or HC patches because the patch system on OneFS can block new operations for system integrity. Additionally, the QA environment cannot be uninstalled since the QA environment is required to execute the battery of scenarios mentioned above. This can create an incompatibility between customer-facing artifacts (e.g., HC patches, RUPs, etc.) and internal test resources (e.g., QA resources, test packages, etc.).

In various implementations of HC test automation, the messy QA environment can be installed immediately after provisioning a virtual PowerScale system in accordance with standard practices of PowerScale testing, which can cause the HC test automation to fail during attempts to install RUPs, thereby blocking the release process for the HC system. This can make it impossible to move QA installation later in the procedure because doing so can prevent the testing of patch uninstallation later. Further, attempts to make an existing automation work can cause a wastage of many hours of time waiting for completely new systems to be provisioned.

Various embodiments of the subject innovation can address these issues. Embodiments described herein include systems, methods, apparatus and computer program products that can resolve the incompatibility between the customer-facing artifacts and the internal test resources without modifying the customer-facing artifacts and the internal test resources during software testing. Embodiments described herein can provide a solution to resolve the incompatibility discussed herein by using two phases of snapshots on virtual infrastructure. The two phases of snapshots can comprise an efficiency phase to reuse a provisioned system without needing to set up a completely fresh system for each iteration of the software testing, and an incompatibility phase which can allow installation and use of messy internal test resources which can be reverted by restoring the incompatibility snapshot (e.g., by restoring the system using the incompatibility snapshot).

A combination of the efficiency phase and the incompatibility phase can enable efficient and successful testing of products without wasting expensive resources. In a non-limiting example, the efficiency phase can enable the testing process to be time efficient, saving about an hour of time or 50% of a typical duration of a testing process associated with the software testing. An order of operations with respect to the incompatibility phase can further enable a software testing approach that can resolve an incompatibility between mutually incompatible resources. In a non-limiting example, the RUPs and the patch system can be selective about file conflicts, whereas the QA environment can steamroll over conflicting files when the QA environment is installed. Thus, the QA environment can be installed after installing the RUPs and the HC patches on the system, such that restoring the system using an incompatibility snapshot can purge the messy internal test resources.

The efficiency phase can comprise taking a first snapshot (e.g., an efficiency snapshot) of the system after an initial setup of the system is completed and registering system information comprised in the efficiency snapshot with a cloud provider. Doing so can allow an existing user or another user of the system to quickly reuse the system by restoring the system using the first snapshot instead of provisioning and setting up a completely new system. Storing information with the cloud provider can prevent the system from requiring a database. Subsequently, the incompatibility phase can be executed, wherein the incompatibility phase can comprise taking a second snapshot (e.g., the incompatibility snapshot) within which messy QA resources can be installed and dependency tests can be executed, followed by restoring the system using the second snapshot to completely purge the messy QA resources. Restoring the system using the second snapshot can allow the existing user or the other user to perform patch operations from the respective point in time.

The general approach of using two nested snapshots for efficiently solving an otherwise intractable problem can be translated to one or more different testing problems in different products than those discussed herein. In a non-limiting example, test code which can generally have a lower quality bar than product code can be difficult or impossible to cleanly uninstall, and the snapshot strategy discussed herein can reduce or eliminate engineering time spent on resolving such conflicts. In another non-limiting example, entities that need to test release artifacts that can overlap with internal-only test artifacts can face similar limitations during testing as those described above, and implementing the one or more embodiments herein can assist with deconflicting the various artifacts. In general, the two-phase snapshot approach can be critical to solving a time-sensitive problem that can block a software release. The various steps involved in implementing the one or more embodiments of the subject innovation have been discussed in greater details with reference to the figures.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200, 300 and 400 as illustrated at FIGS. 1-4, and/or systems thereof, can further comprise, be associated with and/or be coupled to one or more computer and/or computing-based elements described herein with reference to an operating environment, such as the operating environment 1000 illustrated at FIG. 10. In one or more described embodiments, computer and/or computing-based elements can be used in connection with implementing one or more of the systems, devices, components and/or computer-implemented operations shown and/or described in connection with FIG. 10 and/or with other figures described herein.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 illustrates a block diagram of an example, non-limiting system 100 that can enable testing performance of one or more patch artifacts via biphasic nested snapshots in accordance with one or more embodiments described herein.

The system 100 and/or the components of the system 100 can be employed to use hardware and/or software to solve problems that are highly technical in nature (e.g., related to software testing, testing performance and incompatibility of computing resources, etc.), that are not abstract and that cannot be performed as a set of mental acts by a human. Further, some of the processes performed may be performed by specialized computers for carrying out defined tasks related to the software testing/testing performance and incompatibility of computing resources. The system 100 and/or components of the system can be employed to solve new problems that arise through advancements in technology, computer networks, system upgrades and the like. The system 100 can provide improvements to software testing for customer-facing resources, reduce engineering time spent on resolving conflicts arising from the software testing, and/or providing efficient utilization of resources involved in the software testing, etc.

Discussion turns briefly to processor 102, memory 104 and bus 106 of system 100. For example, in one or more embodiments, the system 100 can comprise processor 102 (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, system 100 can comprise a computer-readable memory (e.g., memory 104) that can be operably connected to the processor 102. Memory 104 can store computer-executable instructions that, upon execution by processor 102, can cause processor 102 and/or one or more other components of system 100 to perform one or more actions. In one or more embodiments, memory 104 can store computer-executable components.

System 100 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor 102 and/or memory 104 described above, system 100 can comprise one or more computer and/or machine readable, writable and/or executable components and/or instructions that, when executed by processor 102, can enable performance of one or more operations defined by such component(s) and/or instruction(s). System 100 can be associated with, such as accessible via, a computing environment 1000 described below with reference to FIG. 10. For example, system 1000 can be associated with a computing environment 1000 such that aspects of processing can be distributed between system 100 and the computing environment 1000.

Creators of patch artifacts for a software (e.g., DELL EMC PowerScale data storage products) need to ensure that the patch artifacts operate correctly prior to releasing the patch artifacts to customers. The patch artifacts can comprise RUPs that can resolve functional issues with a product and HC patches that can run checks on a system to ensure correct operations of the system at a customer site. HC patches can check a set of different items (e.g., 50 different items, etc.) on a computing system to ensure that various systems within the computing system can interact with/talk to each other using the same time. In a non-limiting example, an HC patch can ensure that a first system does not indicate that the time is 5 seconds later the time indicated by a second system/machine interacting with the first system. In another non-limiting example, the HC patch can ensure that a computing system is configured correctly to prevent a user from putting the system in a state that can be technically allowed but that can cause the computing system to provide an inferior performance or user experience. HC patches can provide an administrator with a view into whether a computing system is operating optimally, without fixing anything or addressing any defects in the computing system.

RUPs can address various defects and issues in a computing system. In a non-limiting example, an RUP can include a fix for a specific case of data unavailability that a customer can experience on their system, wherein the customer is unable to access data stored on a data storage product. The RUP can also include performance fixes and fixes for an issue in another part of a product wherein a user interface can be implemented. Thus, multiple fixes can be included in one RUP as opposed to deploying the multiple fixes individually (e.g., 100 different patch artifacts) for an older release of the product, wherein the customer having the older release of the product can require the multiple fixes on their system. A customer can have both HC patches and RUPs on their system. The RUPs and the HC patches need to operate correctly alongside each other and individually, irrespective of any other patches that the RUPs and the HC patches can become installed with. Testing for correct operations of the RUPs and the HC patches can comprise installing a test package (e.g., on a computing system) that can enable running specific tests. However, the test package can modify the same files as the RUPs, which can cause execution of patch operations or uninstallation of a patch to fail since the resources can attempt to overlap each other.

In one or more embodiments, system 100 can enable testing performance of at least a first patch, without modifying at least the first patch, prior to releasing at least the first patch as a customer-facing resource, wherein at least the first patch can comprise an HC patch or a roll up patch (RUP), and wherein the RUP can comprise one or more service packs that can remediate one or more product defects. In a non-limiting example, testing for performance or correct operations of the HC patch can comprise running HC items to check for correct results, running internal tests to address behaviors that may not be customer-facing but that can provide guarantees about whether a code is operating correctly, etc. The testing can comprise an efficiency phase (e.g., efficiency phase 110), wherein a first snapshot (e.g., efficiency snapshot 202 of FIG. 2, efficiency snapshot 514 of FIG. 5) of a computing system (e.g., system 100) corresponding to a first point in time can be generated after an initial setup of the computing system, and wherein the first snapshot can be made accessible via cloud storage (e.g., cloud storage 108), enabling an authorized user or another authorized user of the computing system to setup the computing system according to the initial setup. The testing can further comprise an incompatibility phase (e.g., incompatibility phase 112), wherein a second snapshot (e.g., incompatibility snapshot 302 of FIG. 3, incompatibility snapshot 614 of FIG. 6) of the computing system corresponding to a second point in time can be generated after installing at least the first patch applicable to update the initial setup to an updated setup, and wherein the second snapshot can be made accessible via the cloud storage, enabling the authorized user or the other authorized user of the computing system to set up the computing system according to the updated setup after completion of a testing process (e.g., testing process 114).

In one or more embodiments, at least the first patch can be installed after generating the first snapshot, and QA resources can be installed after installation of at least the first patch for execution of dependency tests using the QA resources. The efficiency phase can maintain a duration of the testing below a defined threshold by enabling reuse of the computing system according to the initial setup, without requiring a new setup. Further, the computing system can be restored using the second snapshot after executing dependency tests to purge at least one of a test code or results of the testing process. Restoring the computing system using the second snapshot can allow patch operations on the computing system to resume from the second point in time, and at least the first patch can be uninstalled after restoring the computing system using the second snapshot. Further, the computing system can be tracked for reuse within the cloud storage, wherein use of the cloud storage can enable the testing to be conducted without requiring a database. The testing can additionally comprise testing performance of a second patch and testing respective compatibilities of at least the first patch and the second patch. In general, a solution for successfully testing the patch artifacts can correspond to steps 1-7 in the order listed below.

Step 1: Provision and set up a computing system (e.g., system 100)

Step 2: Take the first snapshot (e.g., efficiency snapshot)

Step 3: Install the HC patch and the RUP

Step 4: Take the second snapshot (e.g., incompatibility snapshot)

Step 5: Install the QA environment and run dependency tests

Step 6: Restore the second snapshot

Step 7: Uninstall the HC patch and/or the RUP

Thus, one or more embodiments herein can enable efficient and successful testing for compatibility and correction operations of mutually incompatible resources via dual snapshots on a simulated system. The mutually incompatible resources can comprise HC patches and RUPs, and the testing can be performed without modifying, and therefore, limiting capabilities of the HC patches and the RUPs. The dual snapshots can enable the testing process to be time efficient, saving about an hour of time or 50% of a typical duration of the testing process, and the simulated system can be discarded after completion of a testing process.

Each snapshot can be a regular snapshot from a perspective of a cloud environment that can enable the snapshots, however, an order of generating the snapshots can assign individual functionalities to each snapshot. The cloud environment can enable the testing to be conducted without requiring a database, wherein each snapshot can be accessible via cloud storage to restore respective versions of a virtual machine corresponding to respective points in time. This can be accomplished by adding a sticky note to the virtual machine with a cloud provider after generating each snapshot at respective points in time. The cloud provider can then be queried to search for the virtual machine corresponding to the respective points in time using the sticky note. On the contrary, using a database can require storing information in a database and querying the database.

Figure 2:
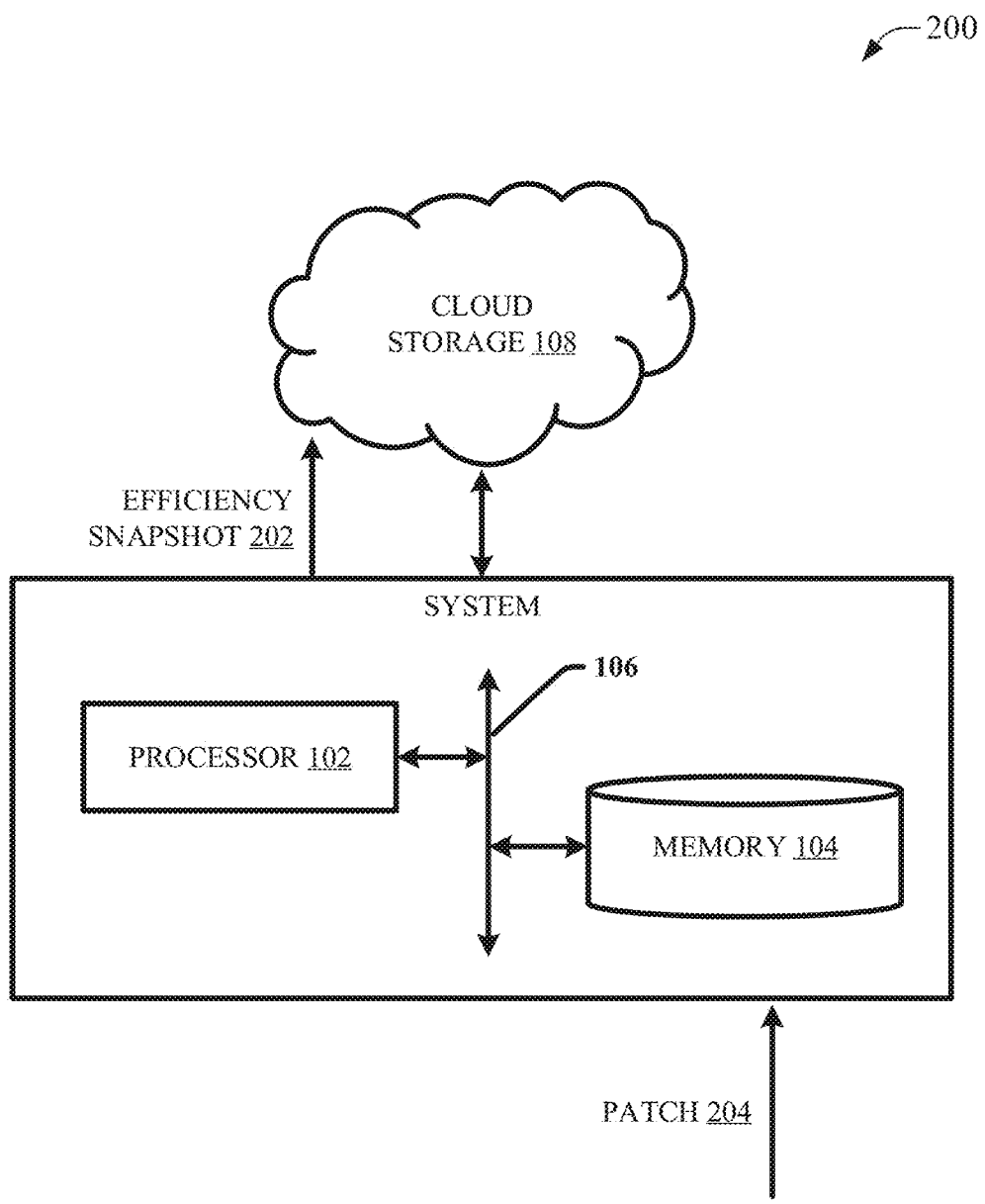
FIG. 2 illustrates a block diagram of an example, non-limiting system that can implement at least a first phase of a process for testing performance of one or more patch artifacts via biphasic nested snapshots in accordance with one or more embodiments described herein.

FIG. 2 illustrates a block diagram of an example, non-limiting system 200 that can implement at least a first phase of a process for testing performance of one or more patch artifacts via biphasic nested snapshots in accordance with one or more embodiments described herein. Repetitive description of like elements and/or processes employed in respective embodiments is omitted for sake of brevity. It is to be appreciated that systems 100, 200, 300 and 400 are analogous.

As stated elsewhere herein, RUPs and HC patches need to operate correctly alongside each other and individually, irrespective of any other patches that the RUPs and the HC patches can become installed with. An HC patch can exhibit correct operations in a development environment at a developer's site (e.g., as new items are developed for the HC patch to examine), however, the HC patch must operate correctly in a context of the HC patch when the HC patch is ready for release to a customer's site. Thus, while the HC patches and the RUPs can be compatible, testing for the HC patches and the RUPs can also comprise testing for correct operations of the HC patches and the RUPs. System 200 can enable testing performance of at least a first patch (e.g., patch 204), without modifying at least the first patch, prior to releasing at least the first patch as a customer-facing resource, wherein at least the first patch can comprise an HC patch or a roll up patch (RUP), and wherein a first phase of the testing can comprise efficiency phase 110 (FIG. 1).

A first step in efficiency phase 110 can comprise provisioning and setting up system 200 at a first point in time for software testing of patch 204. A second step in efficiency phase 110 can comprise taking efficiency snapshot 202 after setting up system 200. At the customer's site, a computing system utilizing patch 204 (e.g., the HC patch and/or the RUP) can run on a cluster of server computers wherein multiple machines (e.g., 150 machines) can be part of one storage cluster, and the multiple machines can interact with each other. However, within the development environment, the testing can be executed via virtual machines (e.g., as opposed to physical machines in a data center) in a cloud environment that can comprise cloud storage 108 wherein a cloud provider running the virtual machines can allow the user to execute a snapshot functionality (e.g., efficiency snapshot 202). Storing information within cloud storage 108 can enable the testing to be conducted without requiring a database.

The cloud environment can enable a user (e.g., an authorized user) of system 200 to take efficiency snapshot 202 after provisioning and setting up of system 200 and upload efficiency snapshot 202 to cloud storage 108. The cloud environment can further enable the user or another user (e.g., another authorized user) of system 200 to restore system 200 corresponding to the first point in time by using efficiency snapshot 202. It is to be appreciated that while virtual machines can be used for conducting the testing, in one or more embodiments, the testing can also be executed on another machine that is not a virtual machine. After generating efficiency snapshot 202, the user can install patch 204 for further testing, additional aspects of which are disclosed with reference to subsequent figures.

Figure 3:
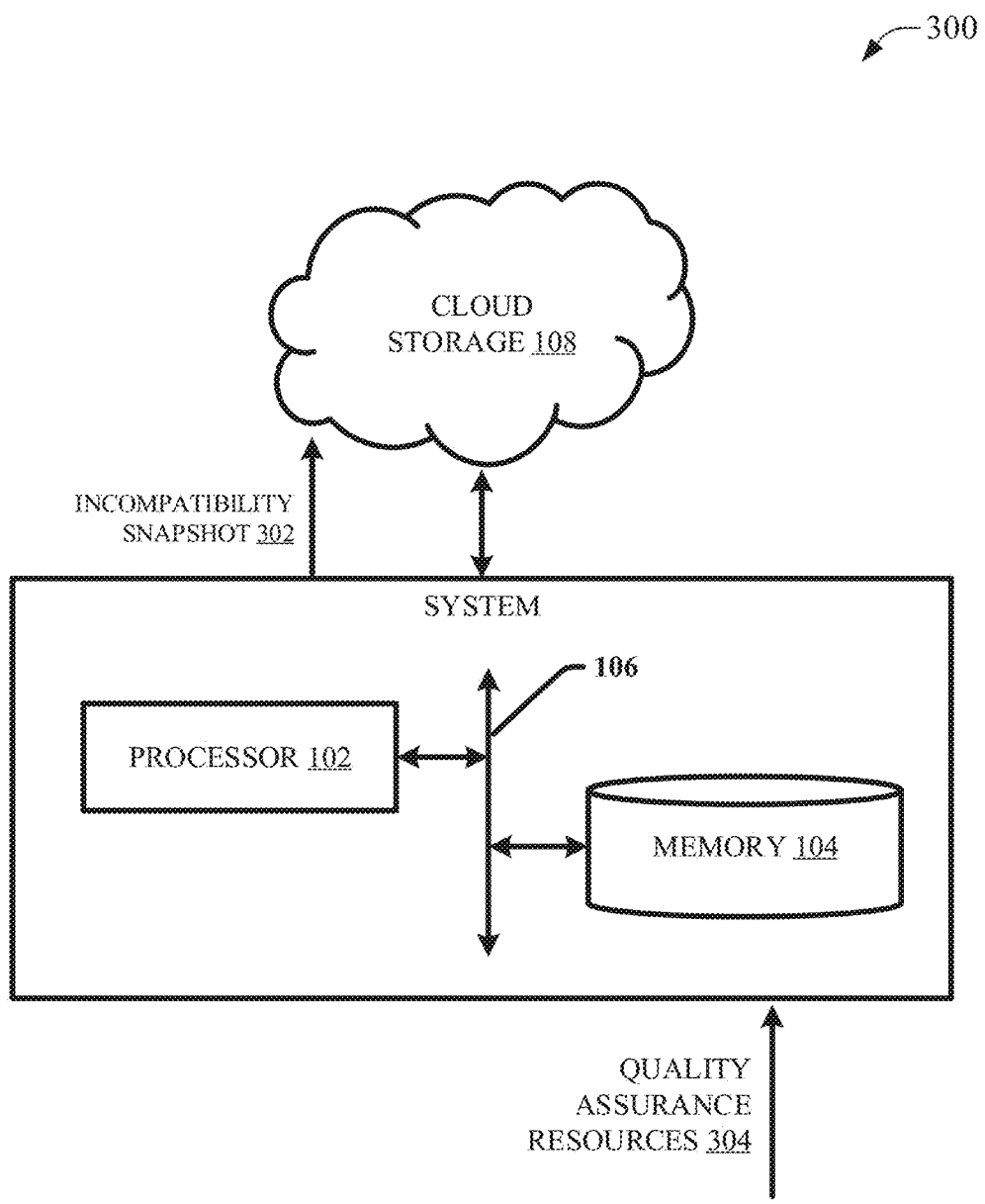
FIG. 3 illustrates a block diagram of an example, non-limiting system that can implement at least a second phase of a process for testing performance of one or more patch artifacts via biphasic nested snapshots in accordance with one or more embodiments described herein.

FIG. 3 illustrates a block diagram of an example, non-limiting system 300 that can implement at least a second phase of a process for testing performance of one or more patch artifacts via biphasic nested snapshots in accordance with one or more embodiments described herein. Repetitive description of like elements and/or processes employed in respective embodiments is omitted for sake of brevity. It is to be appreciated that systems 100, 200, 300 and 400 are analogous.

System 300 can further enable testing performance of at least a first patch (e.g., patch 204 of FIG. 2), without modifying at least the first patch, prior to releasing at least the first patch as a customer-facing resource, wherein at least the first patch can comprise an HC patch or a roll up patch (RUP), and wherein a second phase of the testing can comprise incompatibility phase 112 (FIG. 1). Incompatibility phase 112 can be executed after installation of patch 204. A first step in incompatibility phase 112 can comprise taking incompatibility snapshot 302 of system 300 at a second point in time later than the first point in time (e.g., with reference to FIG. 2). As stated elsewhere herein, the testing can be executed via virtual machines in a cloud environment that can comprise cloud storage 108, wherein a cloud provider running the virtual machines can allow a user (e.g., an authorized user) of system 300 to execute a snapshot functionality (e.g., incompatibility snapshot 302). Storing information within cloud storage 108 can enable the testing to be conducted without requiring a database.

A second step in incompatibility phase 112 can comprise installing quality assurance resources 304 and running dependency tests required for testing compatibility and correct operations of patch 204. Quality assurance resources 304 can comprise test code required for the testing. As discussed in one or more embodiments herein, an order of operations with respect to incompatibility snapshot 302 can further contribute to efficient testing of patch 204. In a non-limiting example, the RUPs and the HC patches can be selective about file conflicts, whereas a QA environment required for conducting the testing can steamroll over conflicting files when the QA environment is installed. Installing quality assurance resources 304 after taking incompatibility snapshot 302 of system 300 can enable the user or another user (e.g., another authorized user) of system 300 to restore system 300 corresponding to the second point in time using incompatibility snapshot 302. Further, restoring system 300 using incompatibility snapshot 302 can completely purge quality assurances resources 304 (e.g., make quality assurance resources 304 non-existent) without requiring time-consuming system clean-up operations that can end up working incorrectly. Additional aspects of restoring system 300 are disclosed with reference to subsequent figures.

Figure 4:
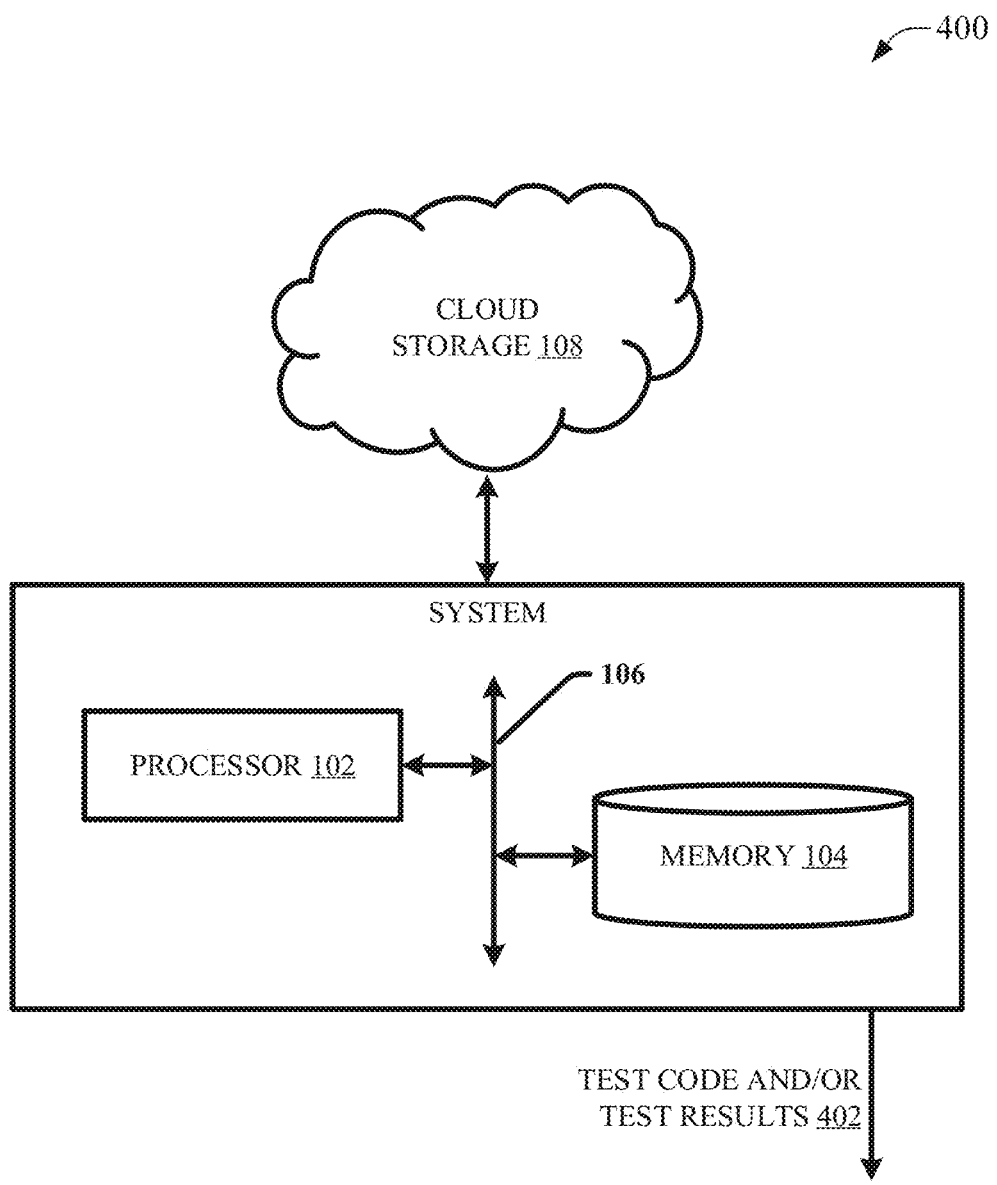
FIG. 4 illustrates a block diagram of an example, non-limiting system that can implement aspects of a process for testing performance of one or more patch artifacts via biphasic nested snapshots in accordance with one or more embodiments described herein.

FIG. 4 illustrates a block diagram of an example, non-limiting system 400 that can implement aspects of a process for testing performance of one or more patch artifacts via biphasic nested snapshots in accordance with one or more embodiments described herein. Repetitive description of like elements and/or processes employed in respective embodiments is omitted for sake of brevity. It is to be appreciated that systems 100, 200, 300 and 400 are analogous.

System 400 can further enable testing performance of at least a first patch (e.g., patch 204 of FIG. 2), without modifying at least the first patch, prior to releasing at least the first patch as a customer-facing resource, wherein at least the first patch can comprise an HC patch or a roll up patch (RUP), and wherein the testing can comprise uninstalling at least the first patch. As discussed with reference to FIG. 3, system 300 can be restored corresponding to the second point in time using incompatibility snapshot 302 to completely purge quality assurance resources 304 which can allow patch operations to continue from the second point in time. Restoring system 300 using incompatibility snapshot 302 can also purge test code and/or test results 402 associated with the testing. The testing can conclude by uninstalling patch 204.

Figure 5:
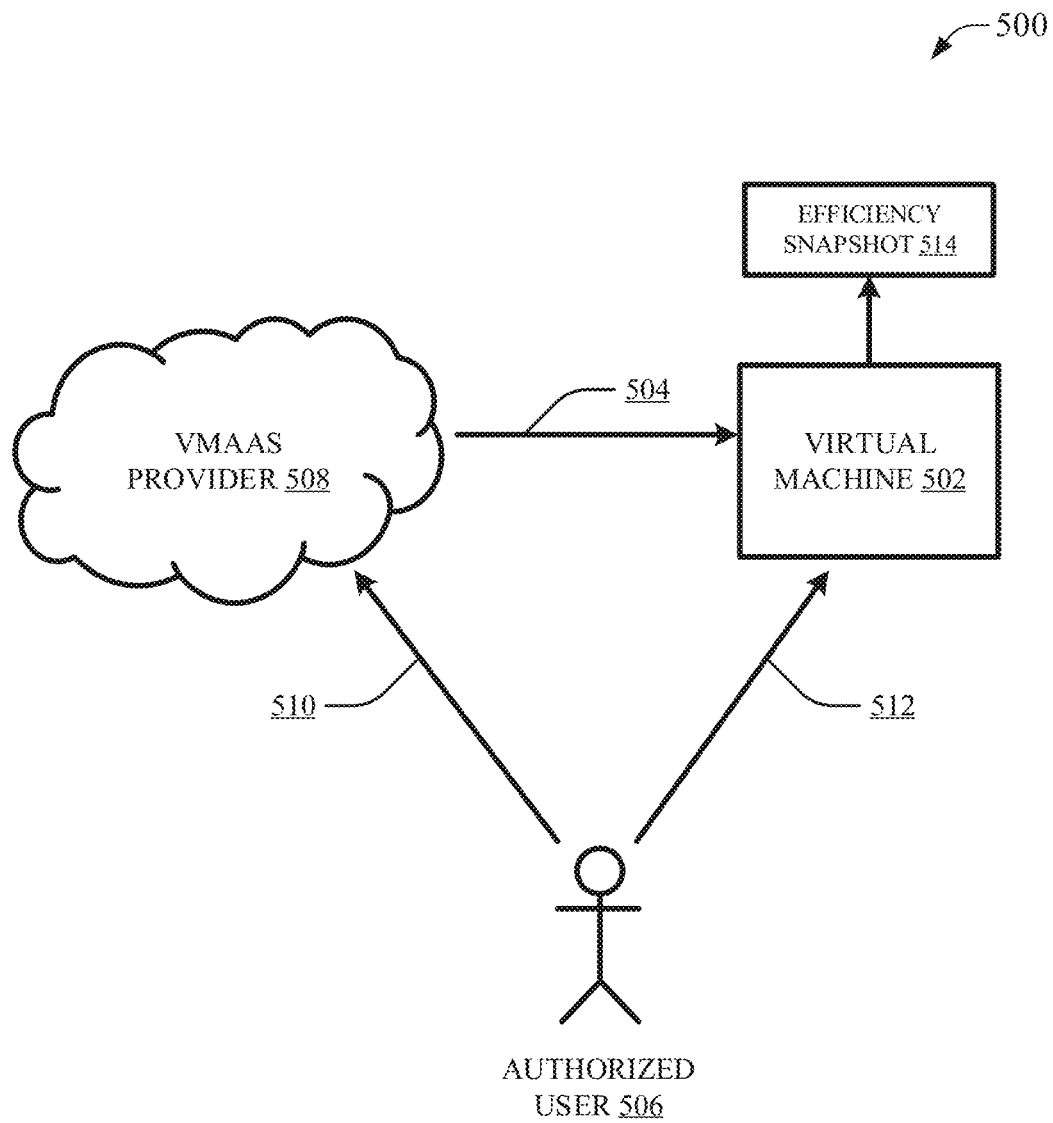
FIG. 5 illustrates a flow diagram of an example, non-limiting method that can implement at least a first phase of a process for testing performance of one or more patch artifacts via biphasic nested snapshots in accordance with one or more embodiments described herein.

FIG. 5 illustrates a flow diagram of an example, non-limiting method 500 that can implement at least a first phase of a process for testing performance of one or more patch artifacts via biphasic nested snapshots in accordance with one or more embodiments described herein. Repetitive description of like elements and/or processes employed in respective embodiments is omitted for sake of brevity.

Method 500 can enable efficient testing of patch artifacts via biphasic nested snapshots, wherein the patch artifacts can comprise an HC patch and an RUP. At 510, authorized user 506 can query for existing systems within a virtual machine as a service (VMaaS) provider 508. The existing systems can comprise virtual machine 502 (e.g., virtual PowerScale OneFS system) that can be pre-provisioned for conducting the testing. Upon querying by authorized user 506, VMaaS provider 508 can determine that virtual machine 502 exists, and authorized user 506 can restore virtual machine 502 by using efficiency snapshot 514. At 504, VMaaS provider 508 can provide virtual machine 502 to authorized user 506. At 512, authorized user 506 can install the HC patch and the RUP on virtual machine 502.

In one or more embodiments, upon querying by authorized user 506, VMaaS provider 508 can determine that virtual machine 502 does not exist, and authorized user 506 can provision and setup a new system for conducting the testing, followed by generating efficiency snapshot 514 corresponding to a first point in time prior to installing the patch artifacts. As such, generating the efficiency snapshot 514 after installing the patch artifacts can cause a testing process to incorrectly skip some test operations. Efficiency snapshot 514 can enable authorized user 506 or another authorized user to restore virtual machine 502 for conducting the testing at a different time. This can be accomplished by adding a sticky note to virtual machine 502 with VMaaS provider 508 after generating efficiency snapshot 514 at a first time and querying VMaaS provider 508 at a later time to search for virtual machine 502 using the sticky note.

Figure 6:
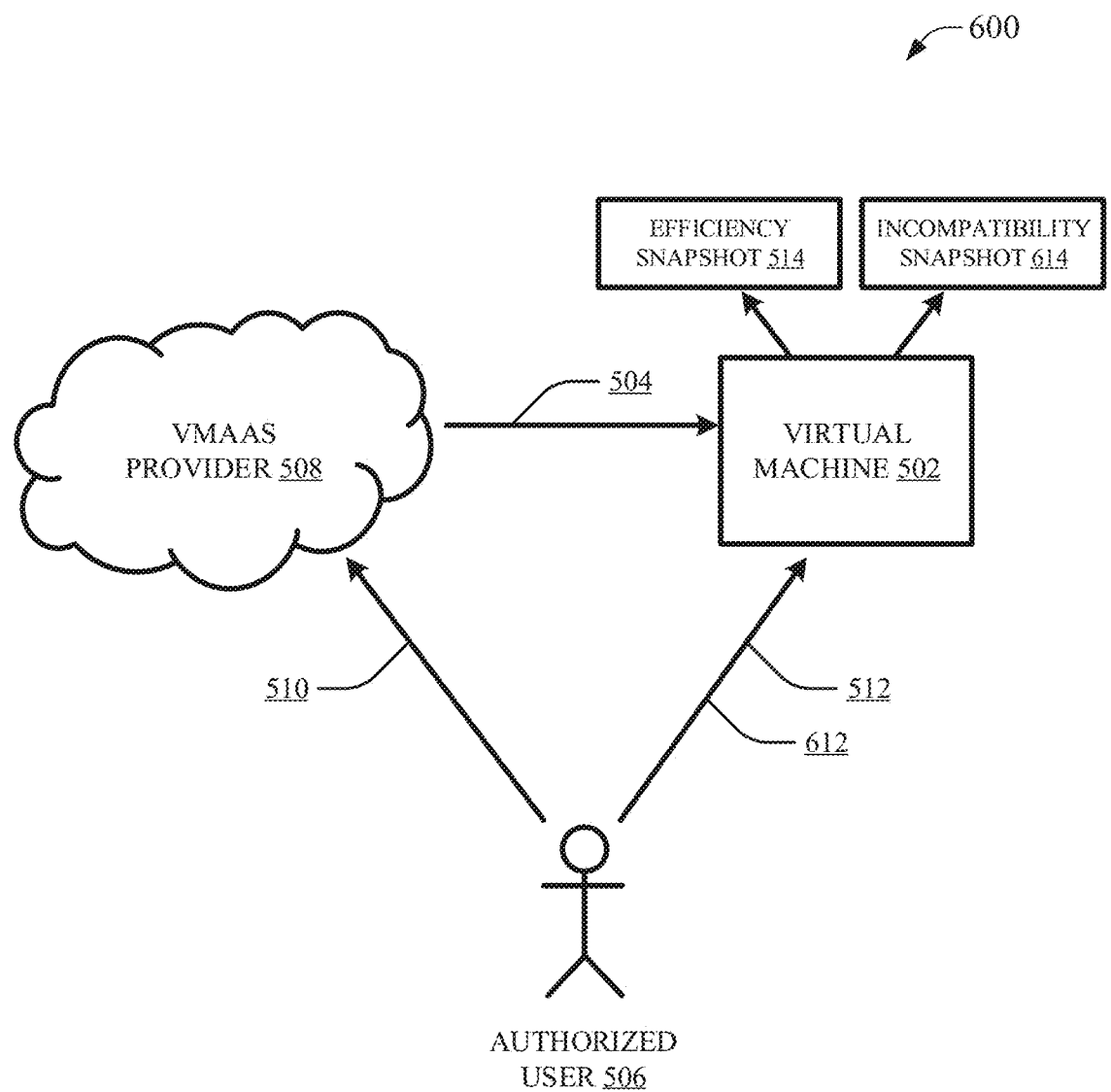
FIG. 6 illustrates a flow diagram of an example, non-limiting method that can implement at least a second phase of a process for testing performance of one or more patch artifacts via biphasic nested snapshots in accordance with one or more embodiments described herein.

FIG. 6 illustrates a flow diagram of an example, non-limiting method 600 that can implement at least a second phase of a process for testing performance of one or more patch artifacts via biphasic nested snapshots in accordance with one or more embodiments described herein. Repetitive description of like elements and/or processes employed in respective embodiments is omitted for sake of brevity.

Method 600 can enable subsequent aspects of method 500, wherein after installing the HC patch and the RUP on virtual machine 502, at 512, authorized user 506 can generate incompatibility snapshot 614 corresponding to a second point in time. At 612, authorized user 506 can install a QA environment and conduct QA dependent tests for testing compatibility and respective performances of the HC patch and the RUP to ensure successful patch operations. After conducting the testing, authorized user 506 or another authorized user can restore virtual machine 502 corresponding to the second point in time by using incompatibility snapshot 614. This can be accomplished by adding a sticky note to virtual machine 502 with VMaaS provider 508 after generating incompatibility snapshot 614 at a second time and querying VMaaS provider 508 after conducting the testing to search for virtual machine 502 using the sticky note.

Further at 612, authorized user 506 can perform a final step of the testing by uninstalling the HC patch and the RUP. As stated elsewhere herein, incompatibility snapshot 614 can enable authorized user 506 to test uninstallation of patches by purging messy QA resources, test codes and/or test results associated with the testing, wherein presence of the QA environment can prevent the patches from being uninstalled. The testing can conclude upon uninstallation of the HC patch and the RUP, and authorized user 506 can notify VMaaS provider 508 that the testing has concluded so that virtual machine 502 can be made accessible to another authorized user. Methods 500 and 600 can illustrate a first testing process such that efficiency snapshot 514 or incompatibility snapshot 614 can become available via cloud storage for a second testing process only after completion of the first testing process.

Figure 7:
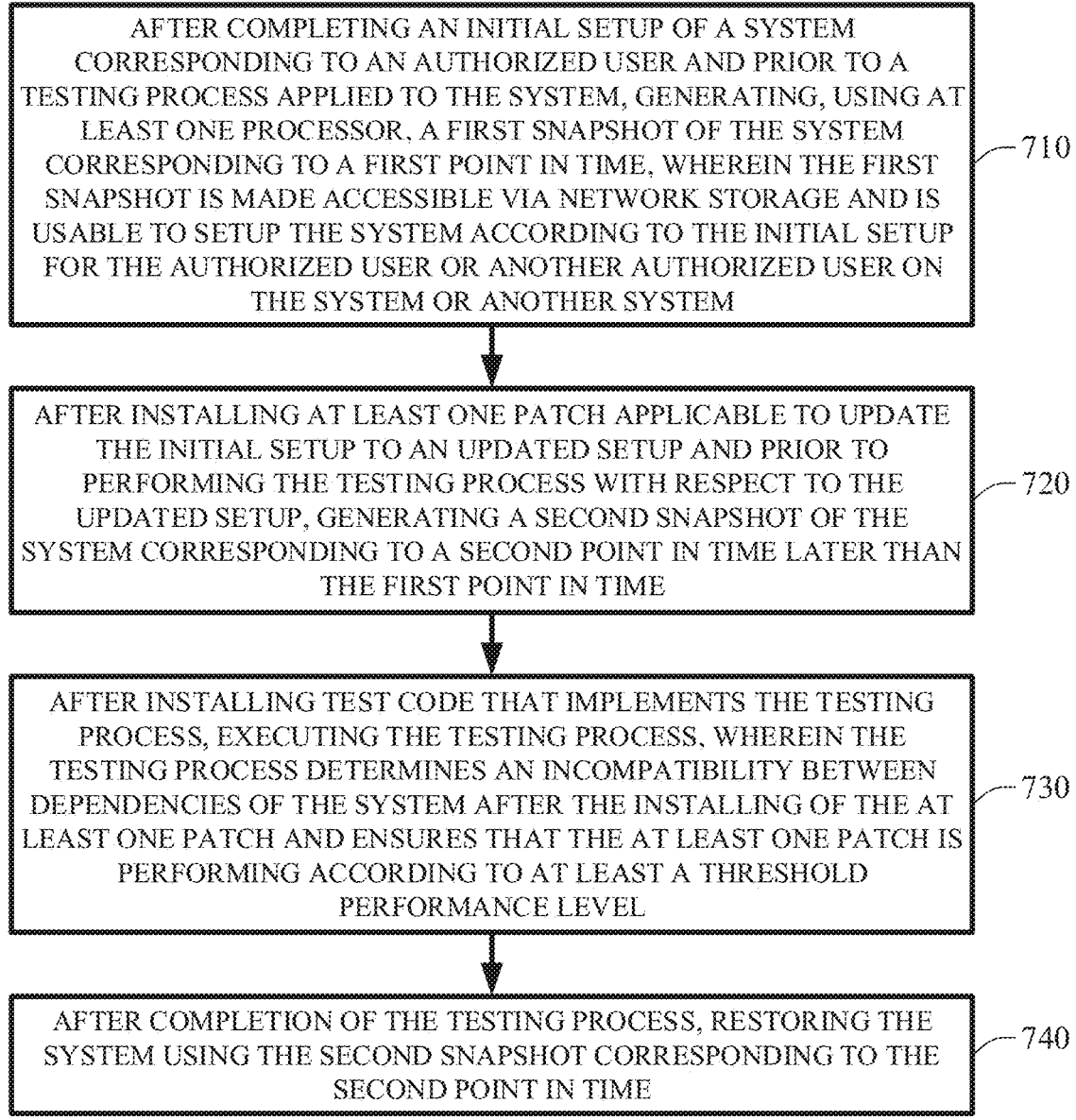
FIG. 7 illustrates a flow diagram of an example, non-limiting method that can enable a software testing approach that can resolve an incompatibility between customer-facing artifacts and internal test resources in accordance with one or more embodiments described herein.

FIG. 7 illustrates a flow diagram of an example, non-limiting method 700 that can enable a software testing approach that can resolve an incompatibility between customer-facing artifacts and internal test resources in accordance with one or more embodiments described herein. Repetitive description of like elements and/or processes employed in respective embodiments is omitted for sake of brevity.

At 710, method 700 can comprise, after completing an initial setup of a system corresponding to an authorized user and prior to a testing process applied to the system, generating, using at least one processor, a first snapshot of the system corresponding to a first point in time, wherein the first snapshot is made accessible via network storage and is usable to setup the system according to the initial setup for the authorized user or another authorized user on the system or another system.

At 720, method 700 can comprise, after installing at least one patch applicable to update the initial setup to an updated setup and prior to performing the testing process with respect to the updated setup, generating a second snapshot of the system corresponding to a second point in time later than the first point in time.

At 730, method 700 can comprise, after installing test code that implements the testing process, executing the testing process, wherein the testing process determines an incompatibility between dependencies of the system after the installing of the at least one patch and ensures that the at least one patch is performing according to at least a threshold performance level.

At 740, method 700 can comprise, after completion of the testing process, restoring the system using the second snapshot corresponding to the second point in time.

Figure 8:
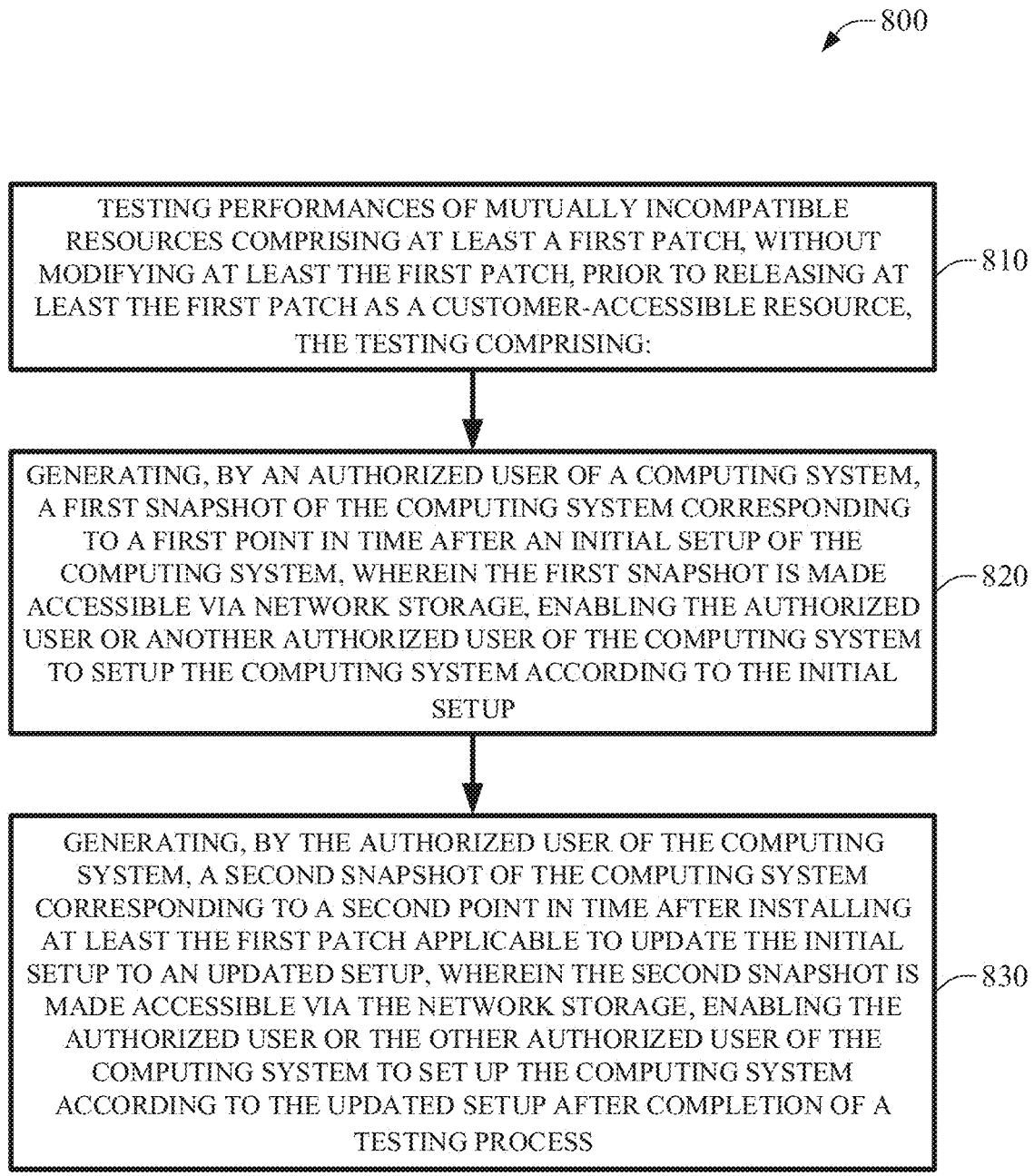
FIG. 8 illustrates a flow diagram of an example, non-limiting method that can enable testing for performances of mutually incompatible resources comprising patch artifacts in accordance with one or more embodiments described herein.

FIG. 8 illustrates a flow diagram of an example, non-limiting method 800 that can enable testing for performances of mutually incompatible resources comprising patch artifacts in accordance with one or more embodiments described herein. Repetitive description of like elements and/or processes employed in respective embodiments is omitted for sake of brevity.

At 810, method 800 can comprise testing performances of mutually incompatible resources comprising at least a first patch, without modifying at least the first patch, prior to releasing at least the first patch as a customer-accessible resource.

At 820 of method 800, the testing can comprise generating, by an authorized user of a computing system, a first snapshot of the computing system corresponding to a first point in time after an initial setup of the computing system, wherein the first snapshot is made accessible via network storage, enabling the authorized user or another authorized user of the computing system to setup the computing system according to the initial setup.

At 830 of method 800, the testing can comprise generating, by the authorized user of the computing system, a second snapshot of the computing system corresponding to a second point in time after installing at least the first patch applicable to update the initial setup to an updated setup, wherein the second snapshot is made accessible via the network storage, enabling the authorized user or the other authorized user of the computing system to set up the computing system according to the updated setup after completion of a testing process.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively test patch artifacts for incompatibilities and for a variety of performance criteria as the one or more embodiments described herein can enable this process. And, neither can the human mind nor a human with pen and paper generate snapshots of a computing system at various stages during a software testing process for testing the incompatibilities and performances of the patch artifacts, as conducted by one or more embodiments described herein.

Figure 9:
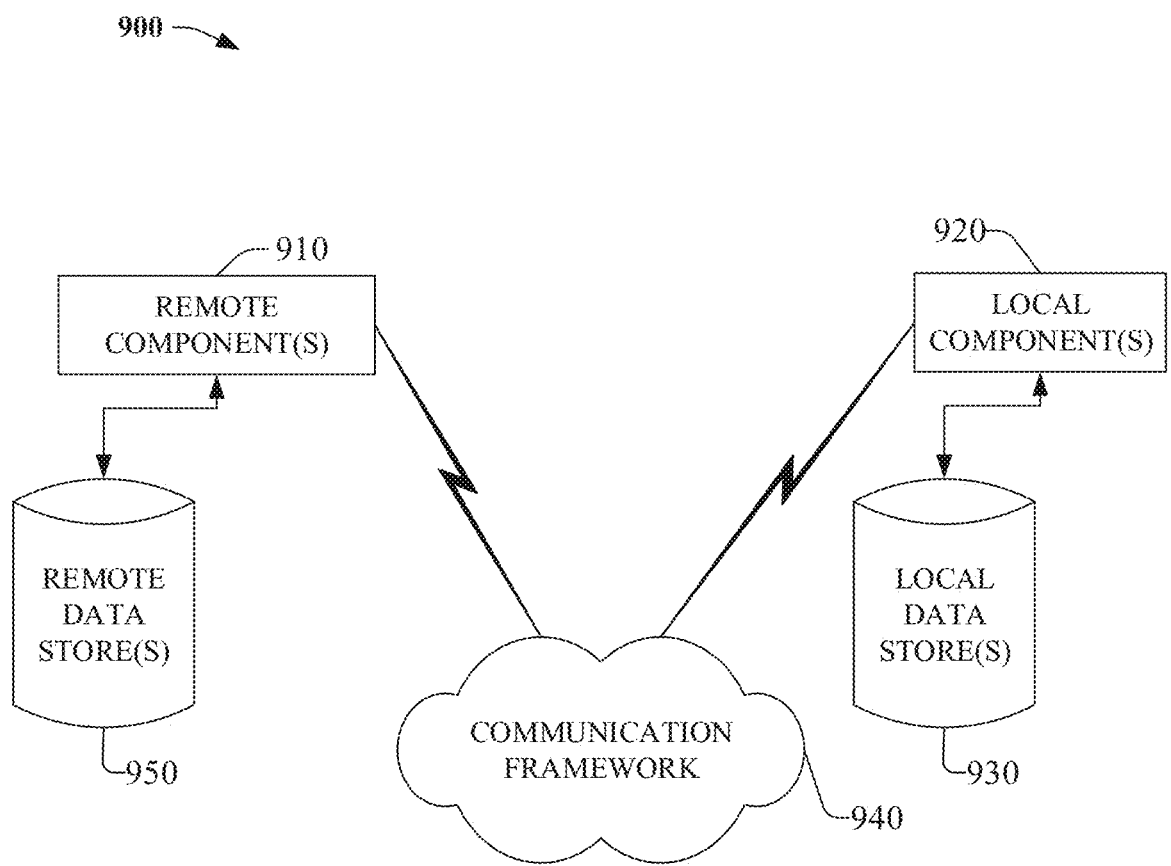
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various elements of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. One or more embodiments described and suggested herein can also be practiced in distributed computing environments where tasks are performed by remote processing devices that are linked through a communications network; however, some if not all parts of the subject disclosure can be practiced on stand-alone computers. In a distributed computing environment, program modules can be located in both local and remote memory storage devices.

Figure 10:
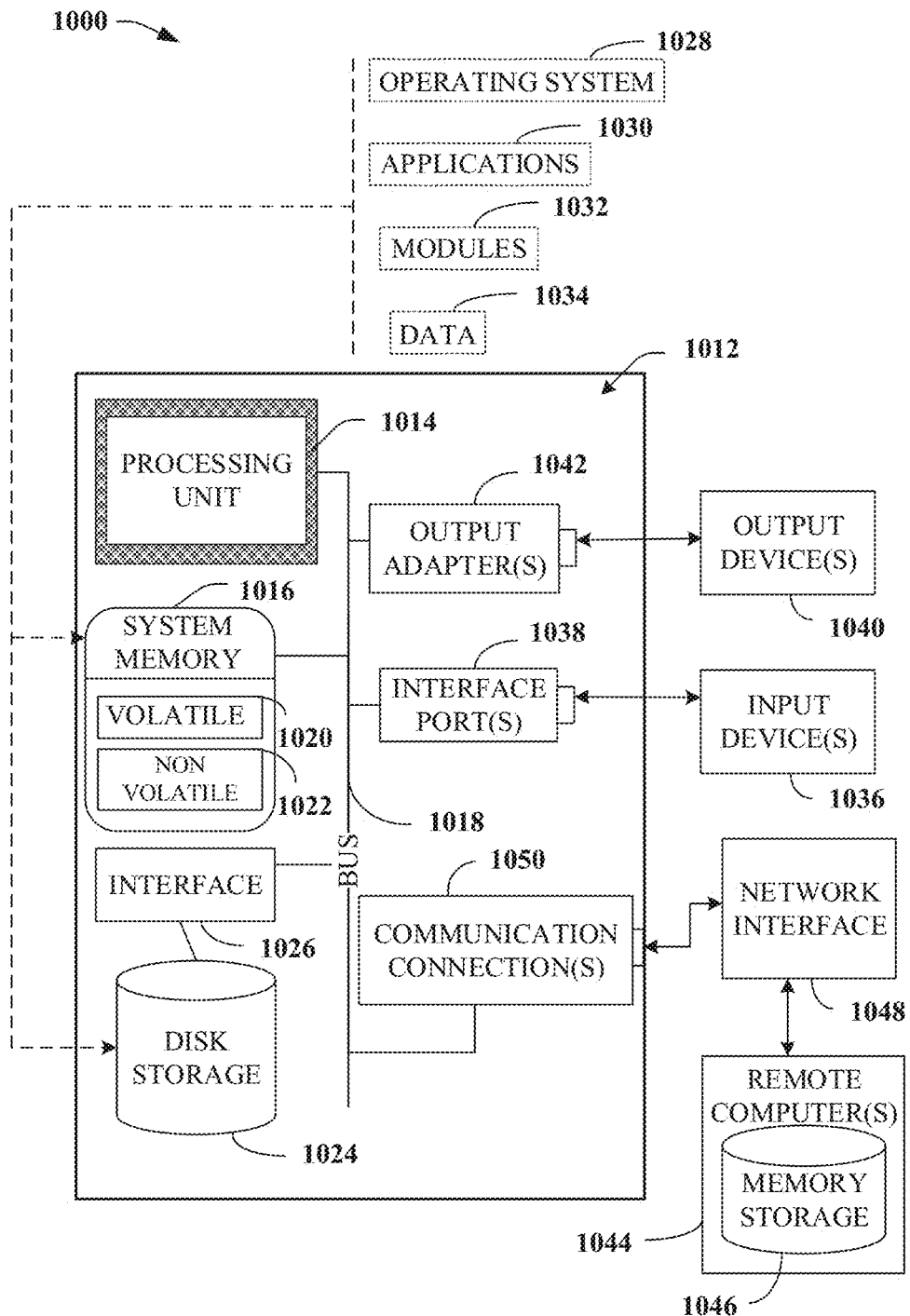
FIG. 10 illustrates an example block diagram of a computing system operable to execute the disclosed systems and methods in accordance with an embodiment.

FIG. 10 illustrates a block diagram of a computing system 1000 operable to execute the disclosed systems and methods in accordance with an embodiment. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHZ. These millimeter waves can be generally situated between microwaves (from about 1 GHz to about 30 GHz) and infrared (IR) waves, and are sometimes referred to as extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed:

1. A method, comprising:
after completing an initial setup of a system corresponding to an authorized user and prior to a testing process applied to the system, generating, by computing equipment comprising at least one processor, a first snapshot of the system representative of a first state of the system at a first point in time, wherein the first snapshot is made accessible via storage of a cloud provider, and is usable to setup the system according to the initial setup for the authorized user or another authorized user on the system or another system, different from the system;
after installing at least one patch applicable to update the initial setup to an updated setup and prior to performing the testing process with respect to the updated setup, generating, by the computing equipment, a second snapshot of the system representative of a second state of the system at a second point in time later than the first point in time;
after installing test code that implements the testing process, executing, by the computing equipment, the testing process, wherein the testing process determines:
an incompatibility between dependencies of the system after the installing of the at least one patch, and
that the at least one patch is performing according to at least a threshold performance level; and
after completion of the testing process, restoring, by the computing equipment, the system using the second snapshot corresponding to the second point in time, wherein the second snapshot is made accessible via storage of the cloud provider, and wherein use of the storage of the cloud provider enables the testing process to be conducted without requiring a database.

2. The method of claim 1, wherein the installing of the test code comprises:
installing quality assurance resources, and
using the quality assurance resources, running dependency tests on the system.

3. The method of claim 1, wherein the restoring of the system using the second snapshot results in a purging of at least one of:
the test code, or
results of the testing process.

4. The method of claim 1, wherein the at least one patch comprises at least one of:
a health check patch, or
a roll up patch, wherein the threshold performance level comprises a level at or above a predicted maximum level of performance.

5. The method of claim 1, wherein use of the first snapshot to setup the system results in a reduction of a setup time applicable to setup of the system or the other system, relative to performing the initial setup.

6. The method of claim 1, further comprising:
delaying, by the computing equipment, installation of the at least one patch until after the generating of the first snapshot.

7. The method of claim 1, wherein the restoring of the system using the second snapshot facilitates a resumption of patch operations on the system from the second point in time.

8. The method of claim 1, wherein the first snapshot and the second snapshot comprise biphasic nested snapshots.

9. The method of claim 1, wherein the first snapshot comprises an instance of a virtual machine configured to perform operations of the system.

10. A system, comprising:
at least one processor; and
a memory that stores executable instructions that, when executed by at least one processor, facilitate performance of operations by the at least one processor, the operations comprising:
testing performance of at least a first patch, without modifying at least the first patch, prior to releasing at least the first patch as a customer-facing resource, wherein the testing comprises:
an efficiency phase, wherein a first snapshot of a computing system corresponding to a first point in time is generated after an initial setup of the computing system, and wherein the first snapshot is made accessible via cloud storage, enabling an authorized user or another authorized user of the computing system to setup the computing system according to the initial setup, and
an incompatibility phase, wherein a second snapshot of the computing system corresponding to a second point in time is generated after installing at least the first patch applicable to update the initial setup to an updated setup, and wherein the second snapshot is made accessible via the cloud storage, enabling the authorized user or the other authorized user of the computing system to set up the computing system according to the updated setup after completion of a testing process; and
restoring the computing system using the second snapshot, wherein use of the cloud storage enables the testing to be conducted without use of a database.

11. The system of claim 10, wherein the operations further comprise:
installing quality assurance resources after the installation of at least the first patch, and
based on the installing of the quality assurance resources executing dependency tests applicable to the computing system using the quality assurance resources.

12. The system of claim 10, wherein the restoring of the computing system occurs after dependency tests are executed to purge at least one of a test code or results of the testing process.

13. The system of claim 10, wherein at least the first patch comprises a health check patch or a roll up patch, and wherein the roll up patch comprises one or more service packs applicable to remediate one or more product defects.

14. The system of claim 10, wherein at least the first patch is installed after generating the first snapshot.

15. The system of claim 10, wherein restoring the computing system using the second snapshot allows patch operations on the computing system to resume from the second point in time.

16. The system of claim 10, wherein the computing system is tracked for reuse within the cloud storage.

17. The system of claim 10, wherein the testing further comprises testing performance of a second patch and testing respective compatibilities of at least the first patch and the second patch.

18. A non-transitory machine-readable medium, comprising executable instructions that, when executed by at least one processor, cause a performance of operations by the at least one processor, the operations comprising:
testing performances of mutually incompatible resources comprising at least a first patch, without modifying at least the first patch, prior to releasing at least the first patch as a customer-accessible resource, the testing comprising:

generating, by an authorized user of a computing system, a first snapshot of the computing system corresponding to a first point in time after an initial setup of the computing system, wherein the first snapshot is made accessible via cloud-based storage, resulting in a first enablement of the authorized user or another authorized user of the computing system to setup the computing system according to the initial setup; and generating, by the authorized user of the computing system, a second snapshot of the computing system corresponding to a second point in time after installing at least the first patch applicable to update the initial setup to an updated setup, wherein the second snapshot is made accessible via the cloud-based storage, resulting in a second enablement of the authorized user or the other authorized user of the computing system to set up the computing system according to the updated setup after completion of a testing process, and wherein use of the cloud storage enables the testing to be conducted without a database.

19. The non-transitory machine-readable medium of claim 18, wherein the operations further comprise:
based on an installation of quality assurance resources after the installing of the at least the first patch, executing dependency tests on the computing system.

20. The non-transitory machine-readable medium of claim 18, wherein the operations further comprise:
after executing dependency tests to purge at least one of a test code or results of the testing process, based on the second snapshot, restoring the computing system; and
resuming patch operations on the computing system from the second point in time.

\* \* \* \* \*